United States Patent
Honda

(10) Patent No.: US 8,379,240 B2
(45) Date of Patent: Feb. 19, 2013

(54) INFORMATION PROCESSING APPARATUS, PRINTING APPARATUS, INFORMATION PROCESSING SYSTEM, PRINT PROCESSING METHOD, STORAGE MEDIUM, AND PROGRAM

(75) Inventor: Kinya Honda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1358 days.

(21) Appl. No.: 12/030,311

(22) Filed: Feb. 13, 2008

(65) Prior Publication Data

US 2008/0309979 A1  Dec. 18, 2008

(30) Foreign Application Priority Data

Jun. 15, 2007  (JP) ................. 2007-159220

(51) Int. Cl.
| G06F 3/12 | (2006.01) |
| G06K 15/00 | (2006.01) |
| H04N 1/00 | (2006.01) |
| H04N 1/40 | (2006.01) |
| H04N 5/00 | (2011.01) |
| G03G 15/20 | (2006.01) |

(52) U.S. Cl. ...... 358/1.14; 358/1.13; 358/1.1; 358/1.16; 358/1.6; 358/448; 348/616; 348/620; 399/70

(58) Field of Classification Search ............... 358/1.13, 358/1.1, 1.14, 1.16; 710/2; 386/264; 399/70
See application file for complete search history.

(56) References Cited

U.S. PATENT DOCUMENTS

| 5,109,255 A * | 4/1992 | Nishikawa et al. ............. 399/70 |
| 5,220,645 A * | 6/1993 | Nakajima .................... 358/1.14 |
| 5,416,600 A * | 5/1995 | Matsumi et al. .............. 386/264 |
| 5,628,574 A * | 5/1997 | Crowley ........................ 400/621 |
| 7,454,528 B2 * | 11/2008 | Kanoshima et al. ............. 710/2 |
| 2003/0061200 A1 * | 3/2003 | Hubert et al. ..................... 707/3 |
| 2005/0168767 A1 * | 8/2005 | Moroney et al. ............. 358/1.14 |
| 2005/0270552 A1 * | 12/2005 | Sakamoto .................... 358/1.13 |
| 2007/0159644 A1 * | 7/2007 | Ushio ............................ 358/1.9 |

FOREIGN PATENT DOCUMENTS

| JP | 03053758 A | 3/1991 |
| JP | 1991-188011 | * 7/1991 |
| JP | 2003-11939 A | 1/2003 |
| JP | 2003011939 | * 1/2003 |

* cited by examiner

*Primary Examiner* — Akwasi M Sarpong
(74) *Attorney, Agent, or Firm* — Carter, DeLuca, Farrell & Schmidt LLP

(57) ABSTRACT

When a printer starts a printing operation using a rolled sheet having IC chips, it is determined whether an error occurred while an IC chip writing device writes information to the IC chips. First page information specifying a page region in which an error occurred and second page information specifying a page region which has been subjected to the printing operation using the printer at a time of occurrence of the error are transmitted to a host computer. Then, recovery information generated using the host computer is obtained, and a print restarting position of a recording medium is controlled so that an information writing position at the time of occurrence of the error corresponds to a position in which the printing operation is restarted. Thereafter, the printing operation is restarted from the printing restarting position in accordance with the recovery information.

18 Claims, 16 Drawing Sheets

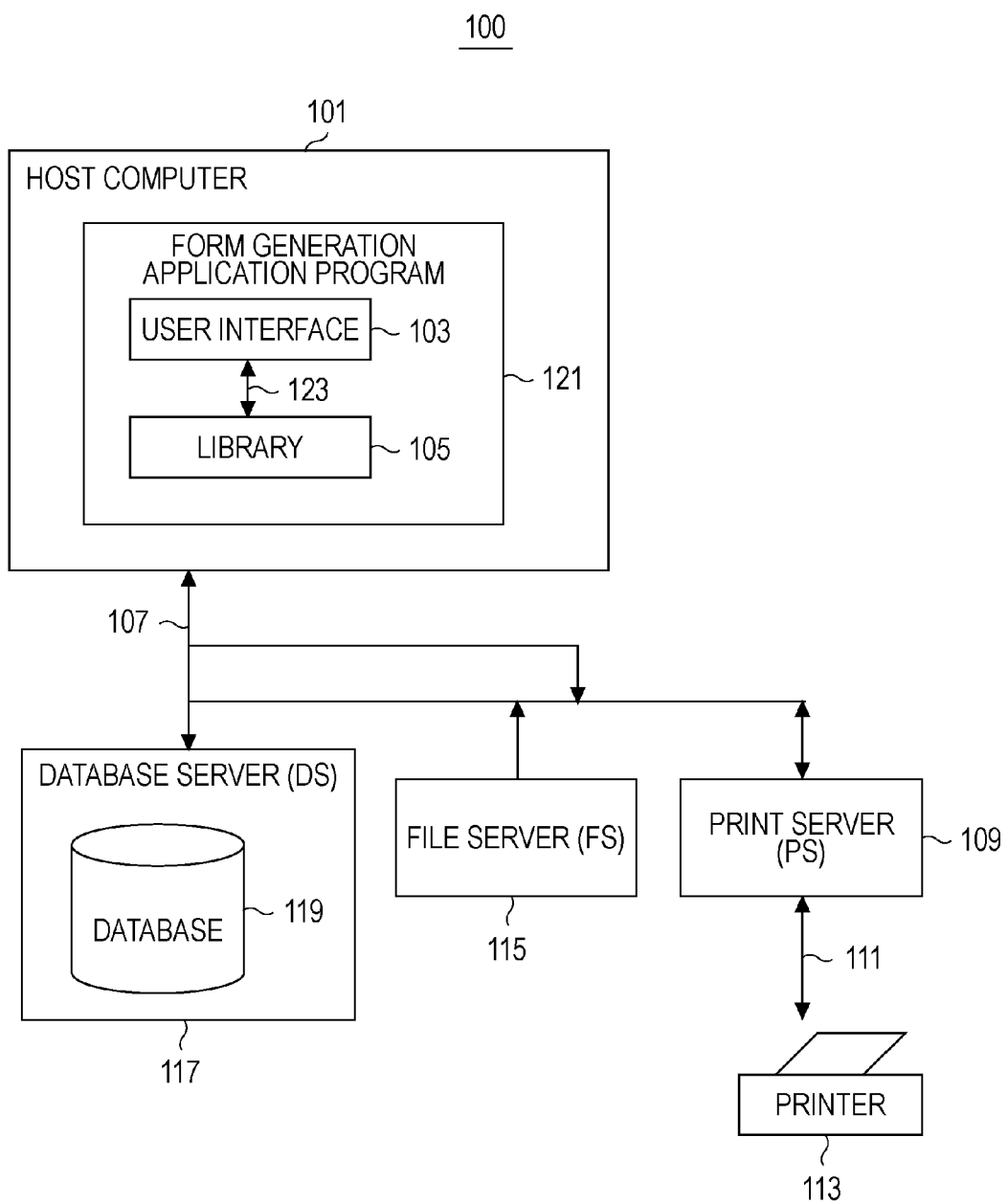

FIG. 10

| DIRECTORY INFORMATION |
|---|
| FIRST DATA PROCESSING PROGRAM<br>PROGRAM CODE GROUP CORRESPONDING TO<br>STEPS OF FLOWCHART IN FIG. 6 |
| |

FIG. 11

| DIRECTORY INFORMATION |
|---|
| FIRST DATA PROCESSING PROGRAM<br>PROGRAM CODE GROUP CORRESPONDING TO<br>STEPS OF FLOWCHART IN FIG. 7 |
| |

INFORMATION PROCESSING APPARATUS, PRINTING APPARATUS, INFORMATION PROCESSING SYSTEM, PRINT PROCESSING METHOD, STORAGE MEDIUM, AND PROGRAM

BACKGROUND OF THE INVENTION

1. Field of the Invention

The present invention relates to printing processing used in an information processing system which includes a printing apparatus capable of conveying a recording medium including information-writable IC chips and which includes an information processing apparatus capable of communicating with the printing apparatus.

2. Description of the Related Art

In general, printers which write electronic information to IC chips when printing operations are performed on sheets including the IC chips are used.

When a label is printed using such a printer, for example, a technique of overlay printing using a printing application may be used.

Referring to FIG. 12, overlay printing performed using this type of printer is described.

FIG. 12 is a diagram illustrating first overlay printing performed using this type of printer.

In a template, fixed characters and graphics which do not rely on data and a portion (field) into which the data is inserted are defined. In this example, a field F1 is defined.

This template is referred to as a form file 301 and the portion into which the data is inserted is referred to as a field.

A data file 302 is a general text file and includes data in accordance with a specific rule.

In the example shown in FIG. 12, an instruction for inserting data "1000 yen" into the field F1 is described. Then, overlay printing is performed using the form file 301 and the data file 302 whereby an output result 303 which is printed material is obtained.

In the example shown in FIG. 12, data FD, such as "KKKKK", is displayed in the field F1. With this technique, the desired output result 303 is obtained by remaining a fixed portion, such as a label, unchanged but merely changing the data in the data file 302 is changed.

FIG. 13 is a diagram illustrating second overlay printing performed using this type of printer. In this example, electronic information is written to an IC chip by the second overlay printing.

As a definition of a form, an attribute indicating "write to the IC chip" is set in a field F2 shown in FIG. 13. Note that a form file 401, a data file 402 and an output result 404 are also shown in FIG. 13.

In a case where data is inserted in a field including the attribute, a printing application instructs a printer to insert the data into the IC chip. Accordingly, data 403 is inserted into the field F2 and written to the IC chip at a time of printing.

However, when the IC chip is physically broken, and therefore, the IC chip denies an access, for example, the data may not be written to the IC chip. In this case, in general, the printer is stopped and displays an error message indicating an occurrence of an error in a panel of the printer, for example.

Thereafter, when a user presses a specific button of the printer, a page in which the error has occurred is skipped and the printing operation is restarted. However, in this case, the following problems arise.

In a case where the error occurred while the data is written to the IC chip, when the printed material is checked with eyes after the printing operation is completed, the user cannot find the error. Furthermore, since the overlay printing operation is interrupted every time an error occurs, entire print efficiency is deteriorated.

To cope with this problem, Japanese Patent Laid-Open No. 2003-11939 discloses a method for switching a printing operation to another printing operation performed when an error occurs while data is being written to the IC chip.

Accordingly, it takes great deal of time and effort for the user to check a page (hereinafter referred to as an "error page" as needed) in which an error occurs while data is being written to the IC chip and to try to print the page again. Therefore, when an error occurs while data is being written to the IC chip, it is necessary not only to switch the printing operation to another printing operation for failure to be performed on the error page but also to perform an operation of printing data to be printed to the error page to another page (hereinafter referred to as a recovery operation). The recovery operation will be described with reference to FIGS. 14 and 15.

FIGS. 14 and 15 are diagrams illustrating examples of a label printing operation performed using this type of printing apparatus. In these examples, a label printer performs a printing operation of writing data to an IC chip.

As shown in FIG. 14, when an IC chip writing operation and a printing operation are performed in this order inside the printer 501, the recovery operation is readily performed, since when an error occurs during an IC chip writing operation 502 or an IC chip reading operation 503, a page in which the error occurred is printed on the next page. A reference numeral 504 denotes a drawing operation.

On the other hand, a problem arises when a printing operation and an IC chip writing operation are performed in this order in a printer, as shown in FIG. 15.

The printer which performs the printing operation in such an order generally does not have a function of writing data to an IC chip as a default function of the printer, and therefore, an optional device having the function of writing data to an IC chip is necessary to be set in a sheet feeding portion thereof.

In this case, when an error relating to the IC chip is detected during an IC chip writing operation 603 or an IC chip reading operation 604, the printing operation has already been performed on few pages (for example, a page 605 shown in FIG. 15). Therefore, a page in which the error occurred during the IC chip writing operation cannot be printed on the next page as a recovery operation. A reference numeral 602 denotes a drawing operation.

Note that even in the case where the IC chip writing operation and the printing operation are performed in this order as shown in FIG. 14, a preparation operation performed before performing the printing operation may have been completed in order to improve performance. In this case also, a problem the same as described above may arise.

SUMMARY OF THE INVENTION

The present invention provides a method for readily checking a replacement page on the basis of a result of a printing operation when information included in a page in which an error occurs while the information is being written to an IC chip is printed on the replacement page. The present invention further provides a method for performing a recovery operation when an error occurs while information is being written to an IC chip.

Accordingly, a printing apparatus according to an exemplary embodiment of the present invention has the following configuration.

There is provided a printing apparatus which performs information printing processing and information writing processing on a recording medium having information-writable IC chips based on information obtained from an information processing apparatus. The printing apparatus includes a printing unit configured to print, in a predetermined information printing position, the information obtained from the information processing apparatus on page regions included in the recording medium which is conveyed, a write unit configured to write, in a information writing position different from the information printing position, electronic information obtained from the information processing apparatus to the IC chips corresponding to, among the page regions, page regions which have been subjected to the information printing processing, a determination unit configured to determine whether an error occurred when the write unit writes the electronic information, a notification unit configured to notify the information processing apparatus of first page information used to specify one of the page regions which is determined that an error occurred using the determination unit and second page information used to specify the page regions which have been subjected to the information printing processing using the printing unit when the error occurred, a control unit configured to obtain recovery information generated using the information processing apparatus and to control a print restarting position of the recording medium so that a position of one of the page regions in which the information was being written at the time of occurrence of the error corresponds to the information printing position, and a recovery printing control unit configured to restart the information printing processing in the print restarting position in accordance with the recovery information, and configured to control the printing unit to print error information on the page in which the error occurred, the page corresponding to the print restarting position, to skip succeeding pages which have been normally printed, and to print a recovery page.

An information processing apparatus according to another exemplary embodiment of the present invention has the following configuration.

There is provided an information processing apparatus which communicates with a printing apparatus which performs information printing processing and information writing processing on a recording medium having information-writable IC chips. The information processing apparatus includes a generation unit configured to generate, in a case where an error occurs when information is written to one of the IC chips, recovery information used to restart the information printing processing from a page in which the information writing processing performed using the printing apparatus was interrupted, based on page information transmitted from the printing apparatus, and a transmission unit configured to transmit the recovery information generated using the generation unit to the printing apparatus.

A printing apparatus according to a further exemplary embodiment of the present invention has the following configuration.

There is provided a printing apparatus which performs information printing processing and information writing processing on a recording medium having information-writable IC chips based on information obtained from an information processing apparatus. The printing apparatus includes a printing unit configured to print the information obtained from the information processing apparatus on the recording medium, a write unit configured to write electronic information obtained from the information processing apparatus on one of the IC chips included in a corresponding one of a plurality of pages which has been subjected to the information printing processing, a determination unit configured to determine whether an error occurred when the write unit writes the electronic information, a notification unit configured to notify the information processing apparatus of first page information used to specify one of the page regions which is determined that an error occurred using the determination unit, and a recovery printing control unit configured to obtain recovery information generated in the information processing apparatus, and to print a recovery page.

A printing apparatus according to a further exemplary embodiment of the present invention has the following configuration.

There is provided a printing apparatus which performs information printing processing and information writing processing on a recording medium having information-writable IC chips based on information obtained from an information processing apparatus. The printing apparatus includes a printing unit configured to print the information obtained from the information processing apparatus on the recording medium, a write unit configured to write electronic information obtained from the information processing apparatus on one of the IC chips included in a corresponding one of a plurality of pages which has been subjected to the information printing processing, a determination unit configured to determine whether an error occurred when the write unit writes the electronic information, and a recovery printing control unit configured to move back the recording medium to a position corresponding to one of a plurality of pages in which an error occurred when the determination unit determined that an error occurred, and to control the printing unit to print error information, to skip succeeding pages which have been normally printed, and to print a recovery page.

Further features of the present invention will become apparent from the following description of exemplary embodiments with reference to the attached drawings.

BRIEF DESCRIPTION OF THE DRAWINGS

FIG. 1A is a block diagram illustrating a configuration of an information processing system to which an information processing apparatus according to a first exemplary embodiment of the present invention is applicable.

FIG. 10 is a diagram illustrating a memory map of a storage medium which stores various data processing programs which are readable using the printing apparatus according to a third exemplary embodiment of the present invention.

FIG. 11 is a diagram illustrating a memory map of a storage medium which stores various data processing programs which are readable using the information processing apparatus according to the third exemplary embodiment of the present invention.

DESCRIPTION OF THE EMBODIMENTS

Figure 1B:
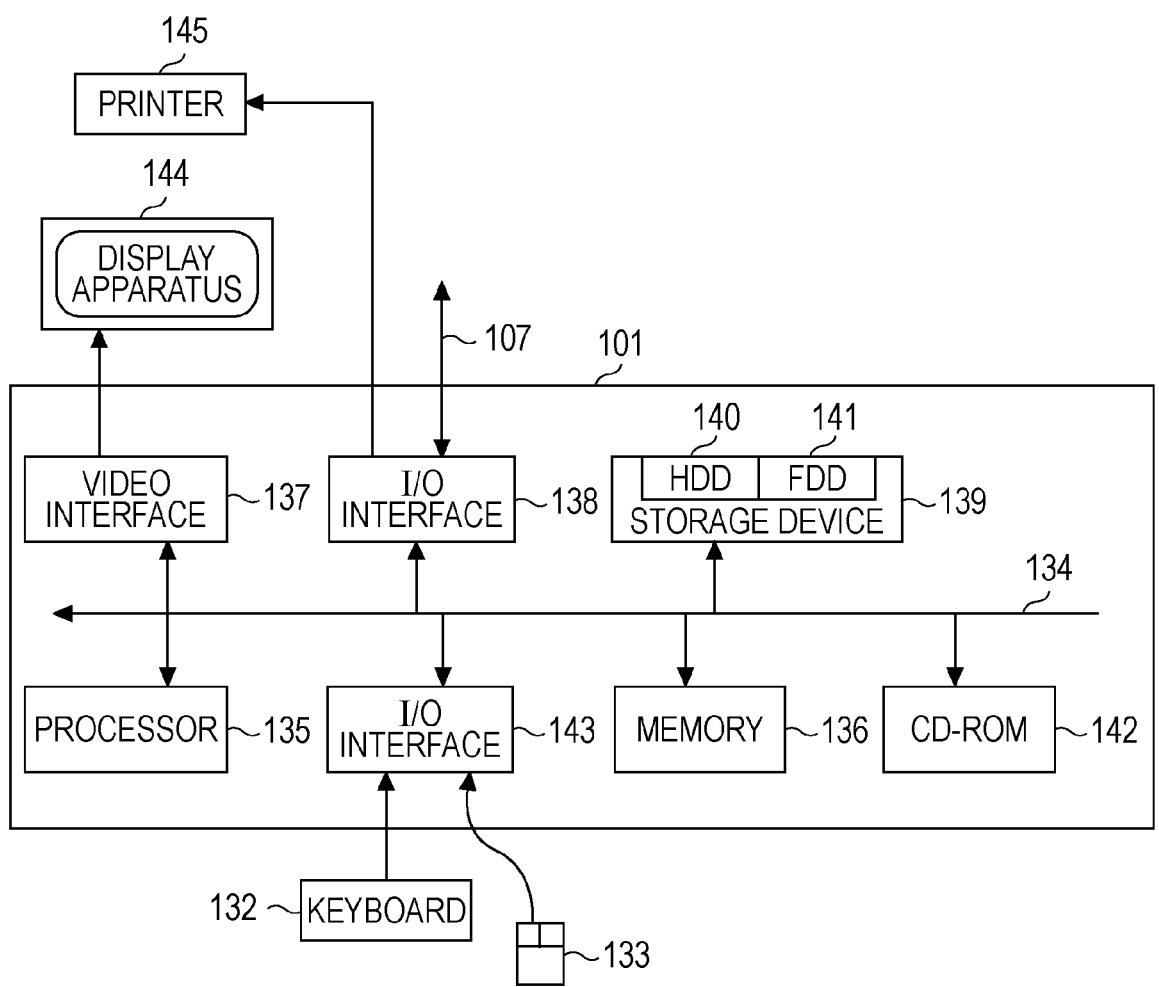
FIG. 1B is a block diagram illustrating a configuration of a host computer shown in FIG. 1A.

Preferred exemplary embodiments of the present invention will now be described with reference to the accompanying drawings.

System Configuration

First Exemplary Embodiment

FIG. 1A is a block diagram illustrating a configuration of an information processing system to which an information processing apparatus according to a first exemplary embodiment of the present invention is applicable. An information processing system 100 including a host computer, a plurality of servers, and a printer which communicate with one another is described as an example.

In FIG. 1A, a host computer 101 is connected to a database server (DS) 117, a file server (FS) 115, and a print server (PS) 109 so as to communicate with each other through a network connection 107. Note that the print server 109 is connected to a printer 113 which is a local printer or a network printer connected through a communication channel 111.

The printer 113 performs a label printing operation which includes a writing operation of writing data to an IC chip (hereinafter referred to as an "IC chip writing operation") and an overlay printing operation. Furthermore, the printer 113 does not include a function of writing data to an IC chip as a default function, and therefore, an option unit having the function of writing data to an IC chip is connected to the printer 113 at a sheet feeding portion thereof. With this configuration, the printer 113 performs the label printing operation which includes the IC chip writing operation and the overlay printing operation. Accordingly, the position in which the label printing operation is performed does not coincide with the position in which the IC chip writing operation is performed. Therefore, when a rolled sheet is used, a delay writing operation is performed as follows. Specifically, after performing the label printing operation on a certain position on a page of the rolled sheet, the position corresponding to a printing head, and transporting the rolled sheet by a length of a few pages, the printer 113 performs the delay writing operation of writing electronic information on an IC chip set in the position on which the label printing operation was performed.

Furthermore, the host computer 101 includes a hardware resource and a software resource which will be described with reference to FIG. 1B.

The host computer 101 includes a form generation application program (form generation AP) 121. The form generation AP 121 is resident in a hard disc drive (HDD) 140 shown in FIG. 1B, is read into a memory 136, and is executed using a processor 135.

The form generation AP 121 causes the HDD 140 to store data obtained through the network connection 107, loads data read from the HDD 140 into the memory 136, and performs a form generation operation.

The form generation AP 121 uses some instances, and the instances are encoded in a CD-ROM or a flexible disc, are read in a drive for a CD-ROM 142 and a corresponding FDD 141, and are provided for a user.

Alternatively, the form generation AP 121 may be read through the network connection 107 in accordance with a user's operation.

Examples of a medium which is used to obtain software include a magnetic tape, a ROM, an integrated circuit, a magneto-optical disc, and a computer readable card such as a PCMCIA card. Furthermore, other computer readable media may be used.

Furthermore, the software may be obtained via communication. Examples of the communication include wireless communication, infrared communication between the host computer 101 and other devices, e-mail communication, and communication via the Internet or an intranet which uses information on Web sites.

Furthermore, the form generation AP 121 instructs generation of a form and performance of a printing operation, and includes two software components. One of the software components is a library 105 which is used to perform an overlay printing operation, for example. The other one of the software components is a user interface 103 which provides a mechanism allowing the user to generate the form and a setting file.

The user interface 103 and the library 105 communicate with each other via a communication channel 123.

A data source used to generate a document is managed in a general database 119 included in the database server 117 which is a computer separately provided and generally operating a database application. The host computer 101 obtains the data source from the database 119 by communicating with the database server 117 through the network connection 107.

The form generation AP 121 generates a form or a setting file as a document and the form and the setting file are stored in the host computer 101 or the file server 115 which is a computer separately provided.

The document is stored in a local file system of the host computer 101 or in the file server 115. Alternatively, the document is directly printed using the printer 113.

The print server 109 provides the printer 113 which is not directly connected to the network connection 107 with a networking function. The print server 109 is connected to the printer 113 through the typical communication channel 111.

FIG. 1B is a diagram illustrating a configuration of the host computer 101 shown in FIG. 1A. Note that reference numerals the same as those used in FIG. 1A are used to denote components shown in FIG. 1B which are the same as those shown in FIG. 1A.

Referring to FIG. 1B, the host computer 101 has an input device including a keyboard 132 and a pointing device such as a mouse 133. Furthermore, the host computer 101 is connected to a display apparatus 144 through a video interface 137, and is connected to a local printer 145 through an I/O interface 138.

The network connection 107 is a local area network (LAN) or a wide area network (WAN).

The host computer 101 includes at least one processor 135 and the memory 136 which is a semiconductor random access memory (RAM) or a read-only memory (ROM).

A storage device 139 includes the HDD 140 and the FDD 141. Note that, although not shown in FIG. 1B, a magnetic tape drive may be used. The CD-ROM 142 is used as a nonvolatile data source.

In the host computer 101, an operating system (OS) such as GNU/LINUX or Microsoft Windows (registered trademark) is installed in the HDD 140.

The host computer 101 performs data processing in accordance with the OS or in accordance with a method performed in an operation mode which is generally used among computer systems configured using a technique of the related art. When performing the data processing, the host computer 101 communicates with devices connected through an interconnection bus 134.

The host computer 101 is, for example, an IBM compatible PC, SPARCstation provided by Sun Microsystems Inc., or a computer system including one of them.

Figure 2:
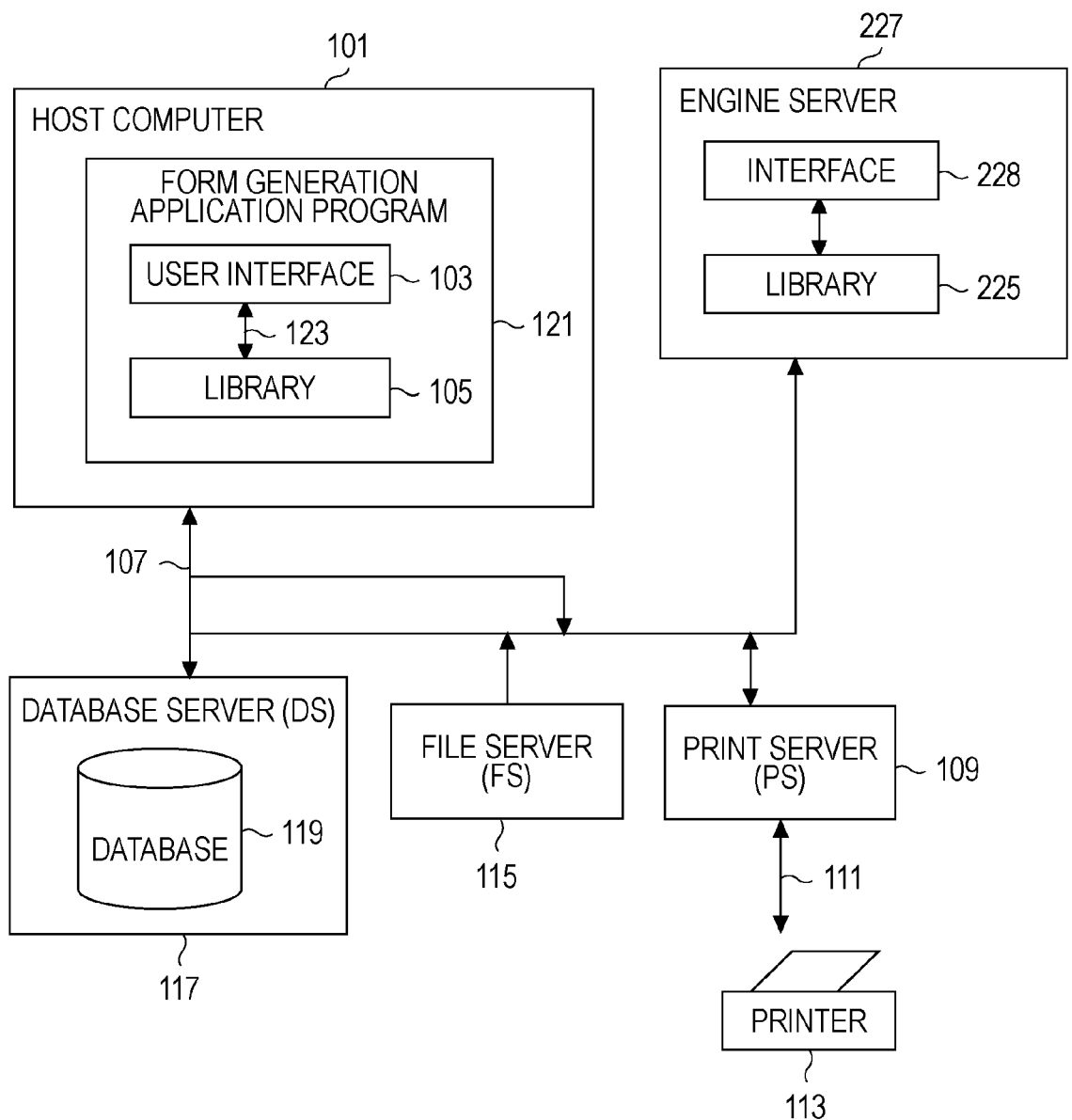
FIG. 2 is a block diagram illustrating another configuration of the information processing system according to the first exemplary embodiment of the present invention.

FIG. 2 is a block diagram illustrating another configuration of the information processing system according to the first exemplary embodiment of the present invention. Note that reference numerals the same as those used in FIG. 1A are used to denote components shown in FIG. 2 which are the same as those shown in FIG. 1A.

In FIG. 2, an engine server 227 performs an overlay printing operation using a form stored in the file server 115 and data which is stored in the database 119 and which is used to generate a document using a library 225.

Note that the overlay printing operation is performed by being requested through the user interface 103 or by inputting an instruction issued by the user to the library 225 through an interface 228.

Figure 3:
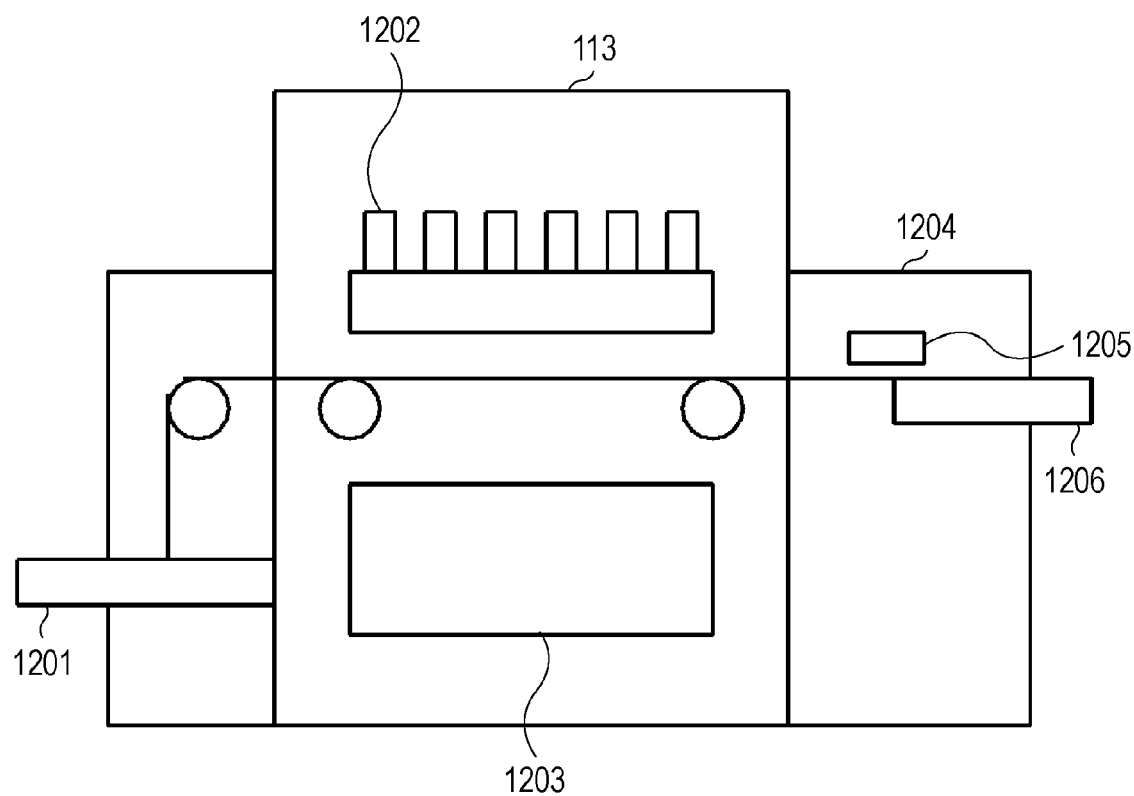
FIG. 3 is a sectional view schematically illustrating a configuration of a printer shown in FIG. 1A.

FIG. 3 is a sectional view schematically illustrating a configuration of the printer 113 shown in FIG. 1A. Note that, in this exemplary embodiment, a rolled sheet is fed as a recording medium to the printer 113. IC chips are arranged on the rolled sheet in predetermined positions.

In FIG. 3, the rolled sheet is set in a sheet feeding portion 1201 so as to be fed into the printer 113. When the rolled sheet reaches a printing position in the printer 113, a printing head 1202 ejects ink so that a printing operation is performed on the rolled sheet. The printing head 1202 functions as a printing unit and is arranged in a predetermined position of the printer 113. The rolled sheet has printing areas, i.e., labels, so that the labels are peelable like stickers from the rolled sheet.

Furthermore, the rolled sheet includes page regions in which electronic information to be obtained from the host computer 101 is printed. An information printing operation is performed on a page-by-page basis in a position of the printing head 1202, which is an information printing position. The electronic information may include a model number, other specifications, a name, a management number, a manufacturing number, and a lot number, for example, of each of the IC chips.

When the rolled sheet reaches an option unit 1204, the electronic information is written to one of the IC chips arranged on the fed rolled sheet using an IC chip writing device 1205 included in the option unit 1204. Note that the position of the IC chip writing device 1205 corresponds to the position at which information is written when an information writing operation is performed. In this exemplary embodiment, the information writing position is set on a downstream side relative to a direction in which the rolled sheet is fed.

Here, the "downstream side" means a downstream side relative to the information printing position determined by the position of the printing head 1202.

Then, the sheet is output from a sheet output portion 1206. A controller 1203 integrally controls a sheet feeding operation, a printing operation, and an electronic information writing operation, for example.

Figure 4:
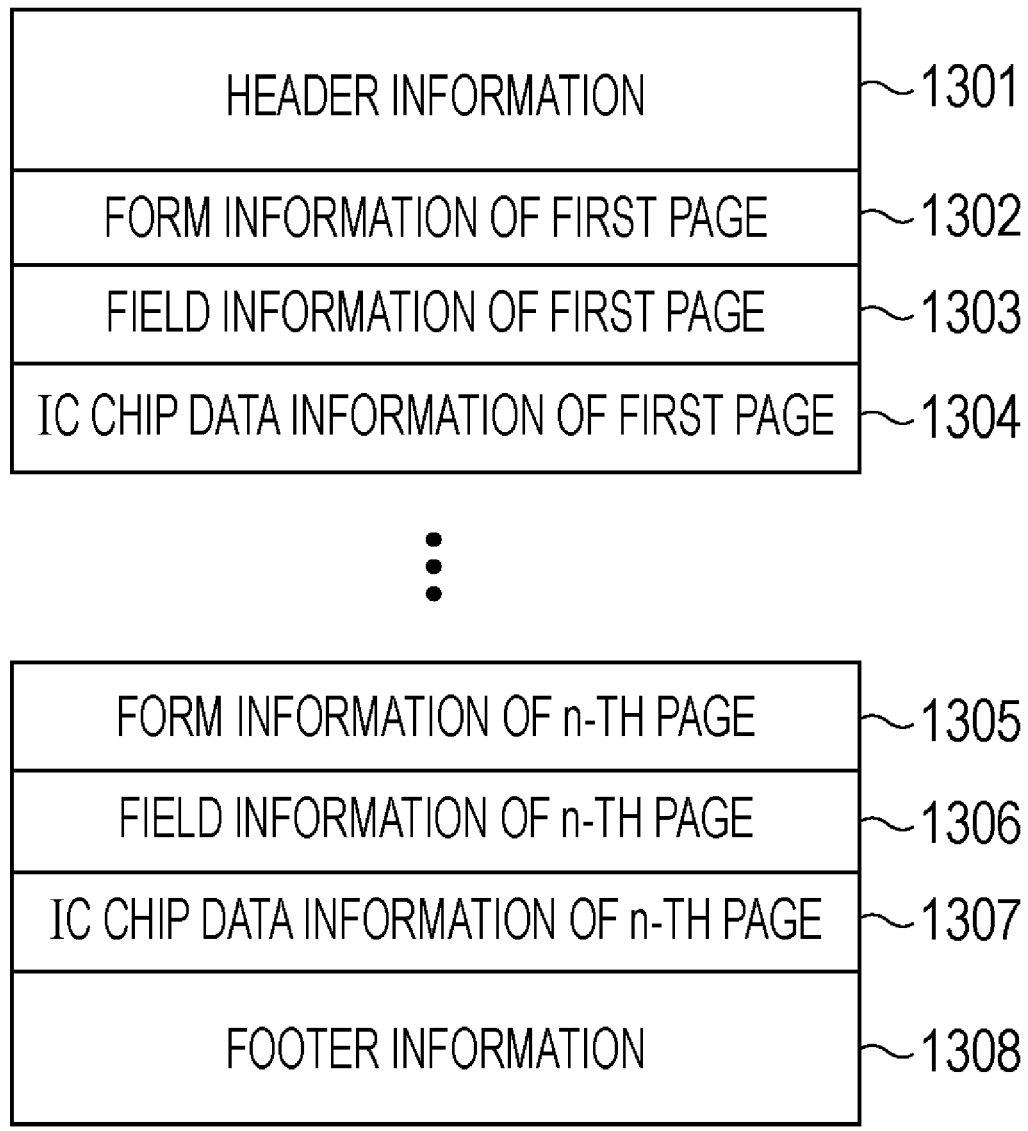
FIG. 4 is a diagram illustrating an example of a print job to be transmitted from a library to a printer shown in FIG. 1A.

FIG. 4 is a diagram illustrating an example of a print job to be transmitted from the library 105 to the printer 113 shown in FIG. 1A.

Header information 1301 is stored in a first portion of the print job. The header information 1301 includes information which is uniquely assigned to the print job, such as a date and time of generation of the print job, and a uniquely assigned ID number. Form information 1302 of a first page is stored in the print job.

The form information 1302 includes print information of a form, such as a line, a drawing, and a character string. Furthermore, field information 1303 of the first page is stored.

The field information 1303 includes print information such as characters stored in a field. Moreover, data information 1304 for an IC chip of the first page is stored.

The data information 1304 for an IC chip includes data information to be written to a corresponding one of the IC chips. The printer 113 processes the form information 1302, the field information 1303, and the data information 1304 whereby a printing operation of printing the first page and an operation of writing data to the corresponding one of the IC chips are performed.

Information (1305, 1306, and 1307) about the second page and the following pages is similarly stored in the print job. In addition, footer information 1308 indicating the end of the job is stored.

In this example, as is apparent from the print job shown in FIG. 4, the host computer 101 (the library 105 shown in FIG. 1A) performs the overlay printing operation of printing a form for each page.

Alternatively, the present invention is applicable to a method for registering a form in a memory included in a printer and for storing a form ID in the print job.

Referring now to a workflow shown in FIG. 5 and flowcharts shown in FIGS. 6 and 7, the overlay printing operation performed under the following conditions will be described.

Figure 5:
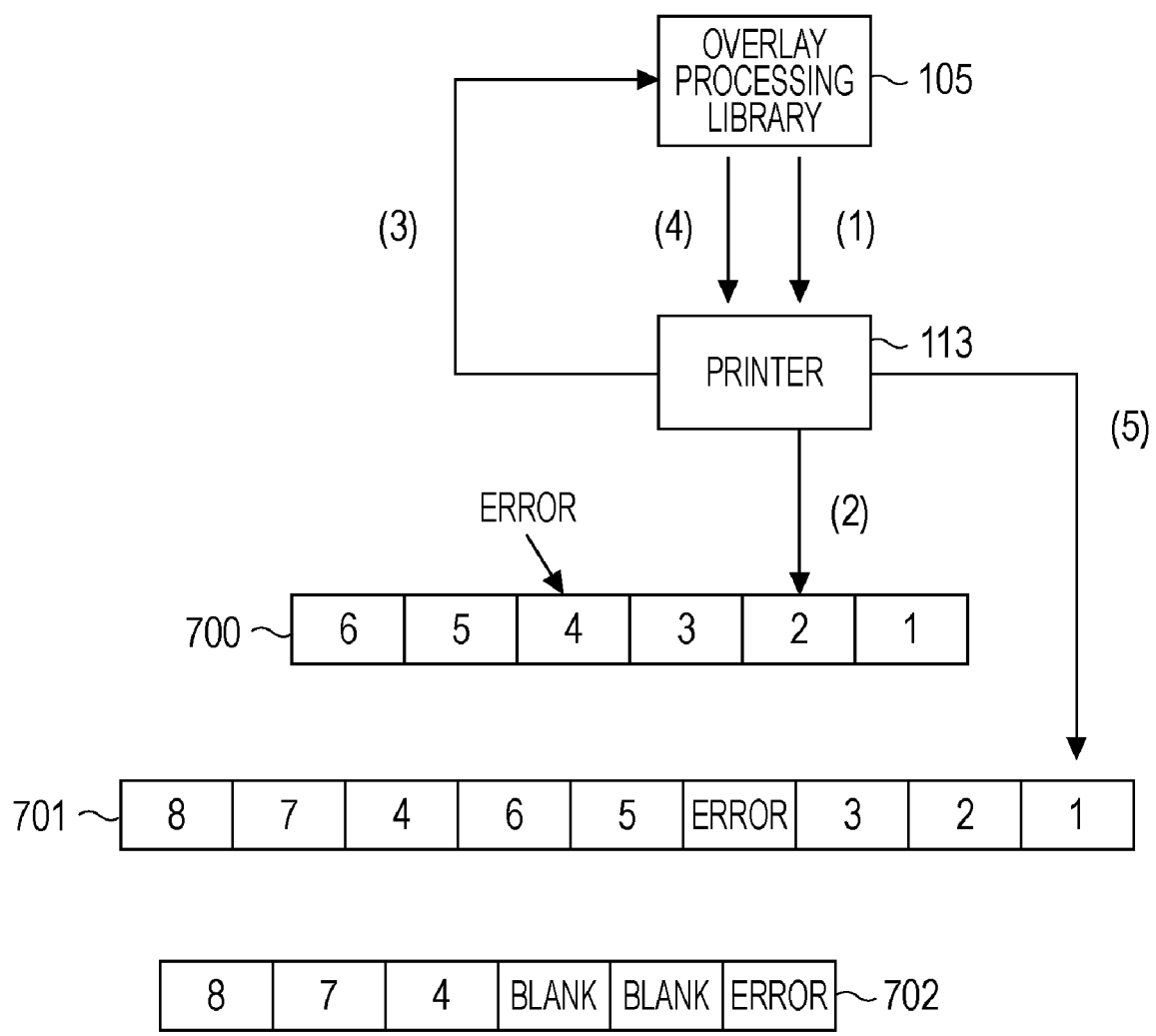
FIG. 5 is a diagram illustrating a workflow of the information processing system of this exemplary embodiment.

FIG. 5 is a diagram illustrating a workflow of the information processing system of this exemplary embodiment.

In this exemplary embodiment, the conditions for the print job are assumed to be as follows: the print job is for eight pages and, among the IC chips, an IC chip of the fourth page of a sheet cannot be used since the IC chip of the fourth page is broken (that is, an error occurs at a time of writing).

Figure 6:
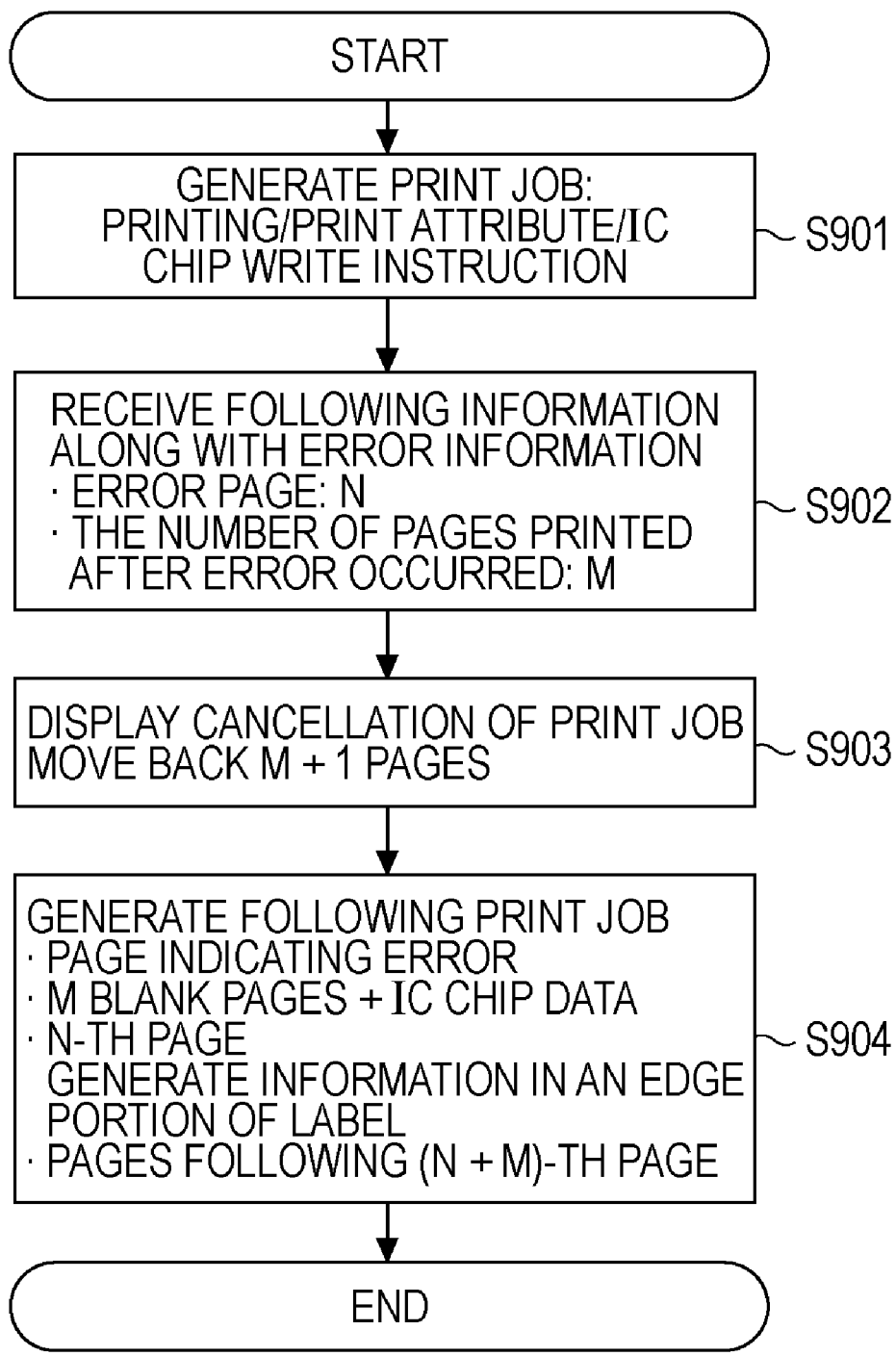
FIG. 6 shows a flowchart illustrating an example of a first data processing procedure of the information processing apparatus of this exemplary embodiment.

FIG. 6 shows the flowchart illustrating an example of a first data processing procedure of the information processing apparatus of this exemplary embodiment. This example is used to illustrate a printing operation performed using the host computer 101. Note that S901 to S904 denote steps. Each of the steps is realized by loading a control program to the memory 136 using the processor 135 and executing the control program.

Figure 7:
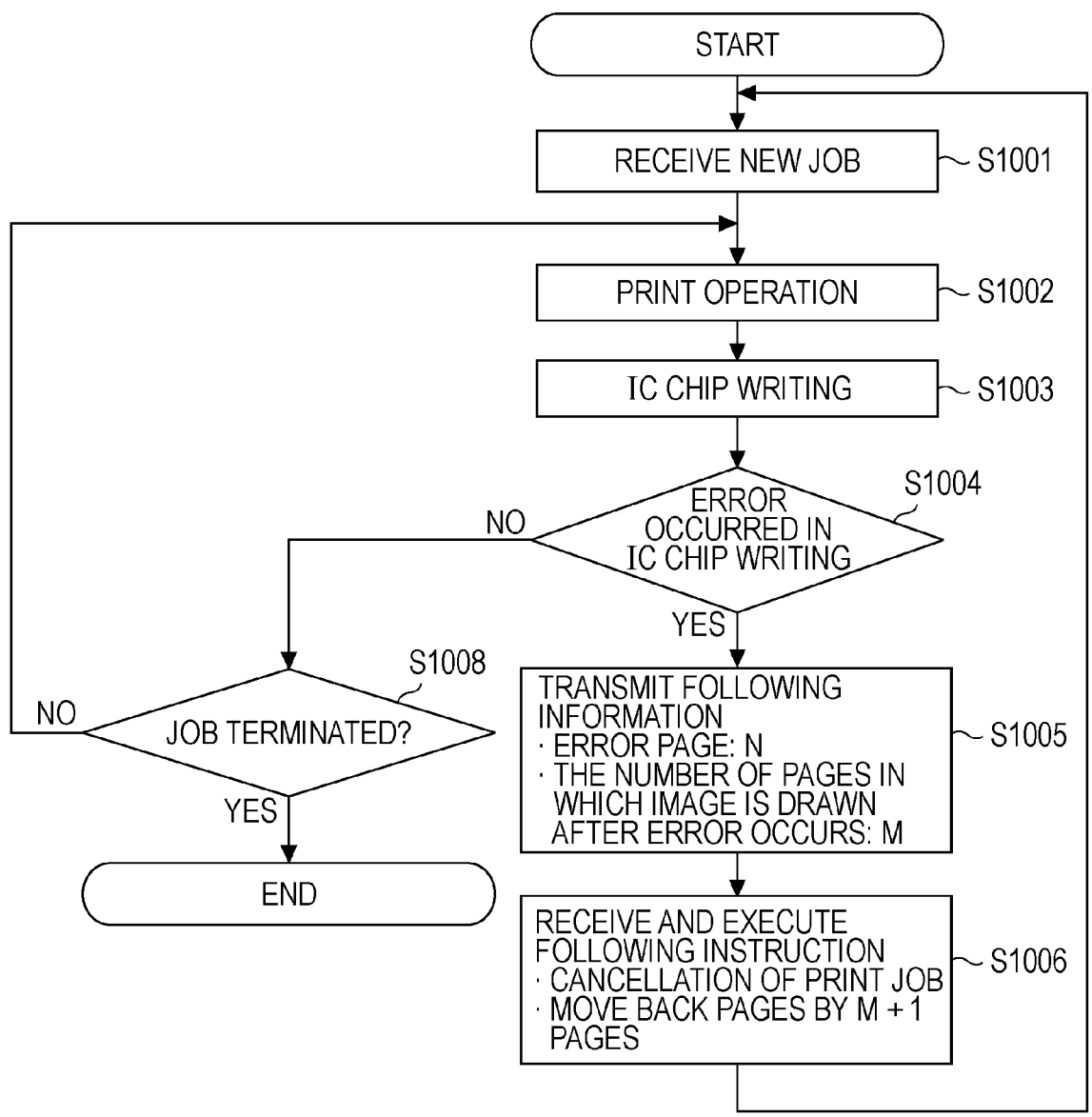
FIG. 7 shows a flowchart illustrating an example of a first data processing procedure of a printing apparatus of this exemplary embodiment.

FIG. 7 shows the flowchart illustrating an example of a first data processing procedure of a printing apparatus of this exemplary embodiment. This example is used to illustrate a printing operation performed using the printer 113. Note that S1001 to S1008 denote steps. Each of the steps is realized by loading a control program using the processor 135 to the memory 136 and executing the control program.

In step S901, the library 105 included in the form generation AP 121 generates a first print job by performing the overlay printing operation, and transmits the generated first print job through the network connection 107 to the printer 113. This step corresponds to a process indicated by (1) in FIG. 5.

In response to the operation performed in step S901, the printer 113 receives the first print job transmitted through the network connection 107 from the library 105 in step S1001.

In step S1002, the printer 113 controls the memory to render an image in accordance with the first print job generated in step S901 of FIG. 6, and the image rendered in the memory is printed on a fed rolled sheet. This step corresponds to a process indicated by (2) in FIG. 5. In step S1003, the printer 113 writes electronic information to one of the IC chips arranged on the rolled sheet. Specifically, when the rolled sheet reaches the option unit 1204, electronic information is written to one of the IC chips arranged on the fed rolled sheet using the IC chip writing device 1205 included in the option unit 1204. For example, first electronic information for the first page is written in the first page of the rolled sheet.

In step S1004, the controller 1203 included in the printer 113 determines whether an error occurred when the IC chip writing device 1205 writes data to the one of the IC chips. When determination is negative in step S1004, the process proceeds to step S1008 where the printing head 1202 included in the printer 113 determines whether all pages of the print job have been processed. When the determination is negative in step S1008, the process returns to step S1002 and the same process is repeated until all the pages are processed.

On the other hand, when the determination is affirmative in step S1008, the process is terminated.

Furthermore, when the determination is affirmative in step S1004, the process proceeds to step S1005 where the printer 113 notifies the library 105 included in the host computer 101 of information which will be described below through the print server 109 and the network connection 107. This notification corresponds to a process indicated by (3) in FIG. 5. The notification is issued when it is determined that an error occurred when data was being written to an IC chip.

In this exemplary embodiment, the printer 113 notifies the host computer 101 of a variable N indicating a page number in which the error occurred, and a variable M indicating the number of pages printed after the occurrence of the error. Here, it is assumed that N is 4 and M is 2.

In an example shown in FIG. 5, an error occurs in the fourth page. However, a printing operation has been performed on the fifth and sixth pages. Therefore, N=4 and M=2 are satisfied. Note that page information which is transmitted from the printer 113 to the host computer 101 includes first page information about a page corresponding to the variable N and second page information about a page corresponding to the variable M.

By this, after the variable N indicating the page number in which the error occurred and the variable M indicating the number of pages printed after the occurrence of the error are transmitted from the printer 113 to the host computer 101, the process of the host computer 101 proceeds to step S902.

In step S902, the library 225 receives the information (that is, the variable N indicating the page number in which the error occurred and the variable M indicating the number of pages printed after the occurrence of the error) transmitted in step S1005 from the printer 113.

In step S903, the library 225 included in the form generation AP 121 instructs the printer 113 to cancel the first print job which was generated in step S901 and to move back M+1 pages (in this exemplary embodiment, since M is 2, M+1 is 3). This process corresponds to a process indicated by (4) in FIG. 5.

Then, in step S1006, the printer 113 receives an instruction issued in step S906 by the library 105 included in the form generation AP 121 of the host computer 101. Then, the printer 113 cancels the first print job generated in step S901 and moves back the rolled sheet by M+1 pages, and the process returns to step S1001.

In this way, the printing head 1202 of the printer 113 is moved back by three pages by skipping the two pages which have been subjected to the printing operation by inversely driving a conveying motor which is used to convey the rolled sheet.

As described above, in this exemplary embodiment, a print restarting position of the printer 113 is controlled in accordance with recovery information (generated in step S904 of FIG. 6) obtained from the host computer 101. Furthermore, in this exemplary embodiment, the host computer 101 controls the printer 113 to restart the printing operation, which has been interrupted, in accordance with the variables N and M transmitted from the printer 113. In this case, control information used to control the print restarting position used when the printing operation which is described above and which is shown in FIG. 8 is restarted includes information about moving back of the rolled sheet which is currently stopped.

Specifically, the printing position of the rolled sheet is shifted in a direction opposite to the feeding direction of the rolled sheet so that a position of one of a plurality of page regions of the recording medium in which the information was being written at the time of occurrence of the error corresponds to the information printing position. Then, the controller 1203 performs positioning control so that the information writing position corresponds to the position of the printing head 1202. Thereafter, the printing operation is restarted from step S1001 on the basis of the recovery information and a printing operation is performed in accordance with a print job 702 shown in FIG. 5 whereby a recovery printing control is performed.

In FIG. 5, pages denoted by "blank" correspond to normally printed pages, and therefore, recovery printing control is not performed on "blank" pages.

In a case where the printing position is necessary to be precisely determined, positioning processing is performed. The position of the printing corresponds to the information printing position in this exemplary embodiment.

The host computer 101 newly generates a second print job so that the library 105 of the form generation AP 121 satisfies the conditions described below and transmits the second print job to the printer 113. The process is thus terminated. Note that the second print job includes recovery information used to print again the page in which an error occurred when data is being written to an IC chip as recovery printing.

The recovery information included in the second print job includes information in which a printing operation is started with the page in which an error occurred, information about a number M of "blank" pages corresponding to the normally printed pages, and information about instruction for writing data to the IC chips. Since the printing operation has been normally performed on the fifth and sixth pages, and therefore, another printing operation is not necessary to be performed thereon, merely electronic information is written to each of the IC chips of the fifth and sixth pages.

Figure 9:
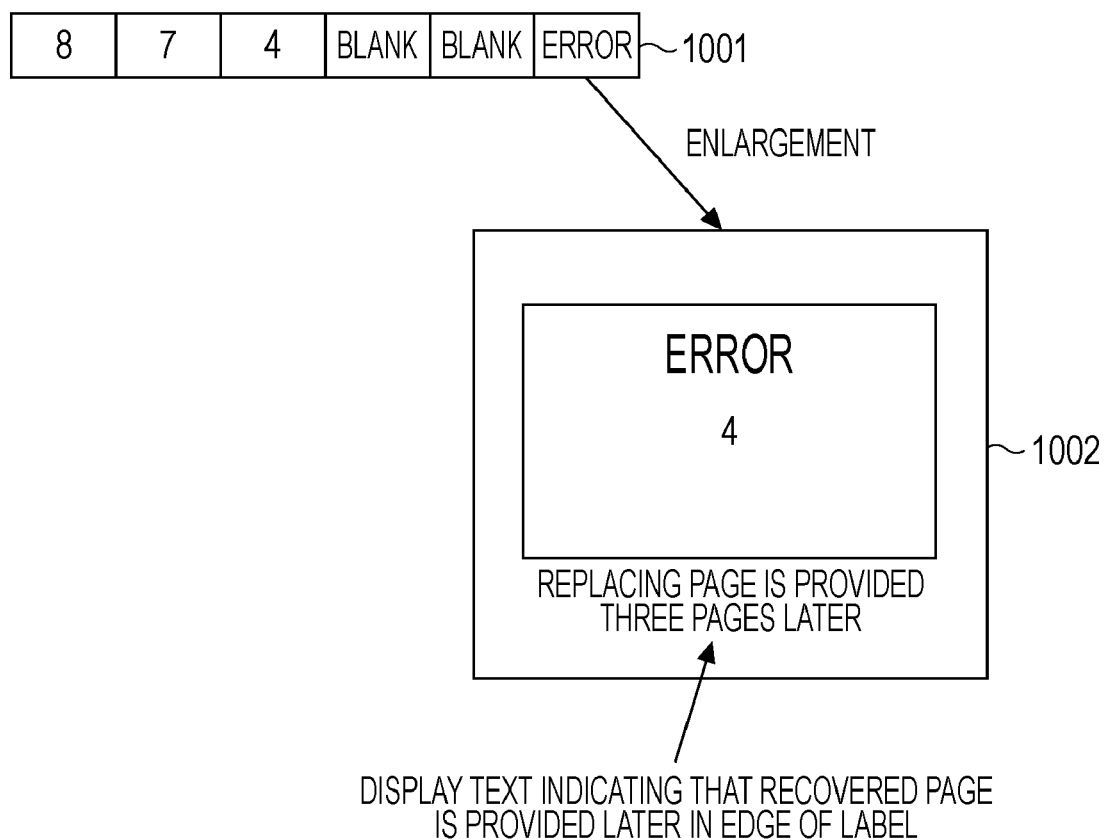
FIG. 9 is a diagram illustrating an example of a recovery operation performed using the printing apparatus of a second exemplary embodiment.
Figure 12:
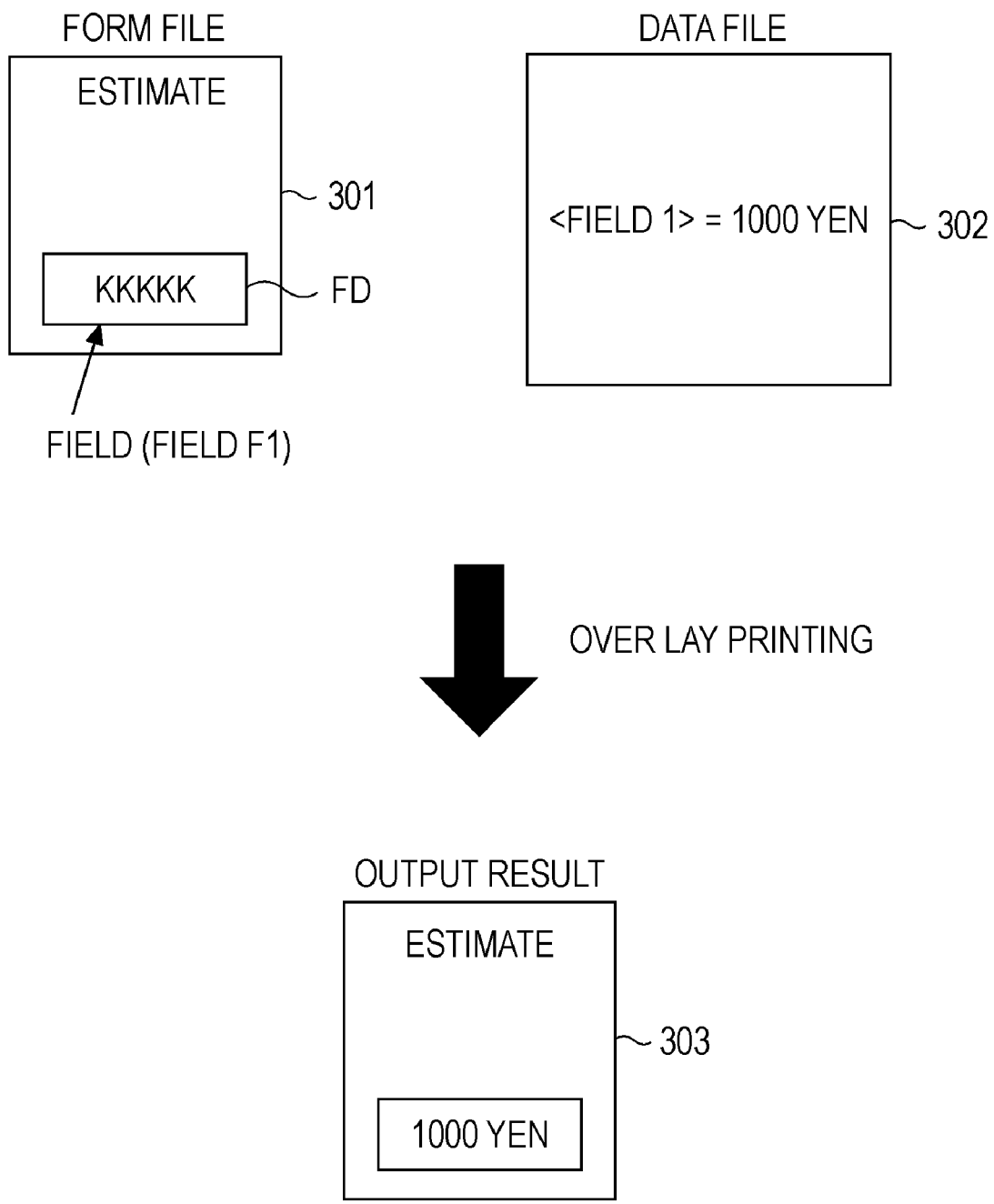
FIG. 12 is a diagram illustrating a first overlay printing operation performed using a printer in the related art.
Figure 13:
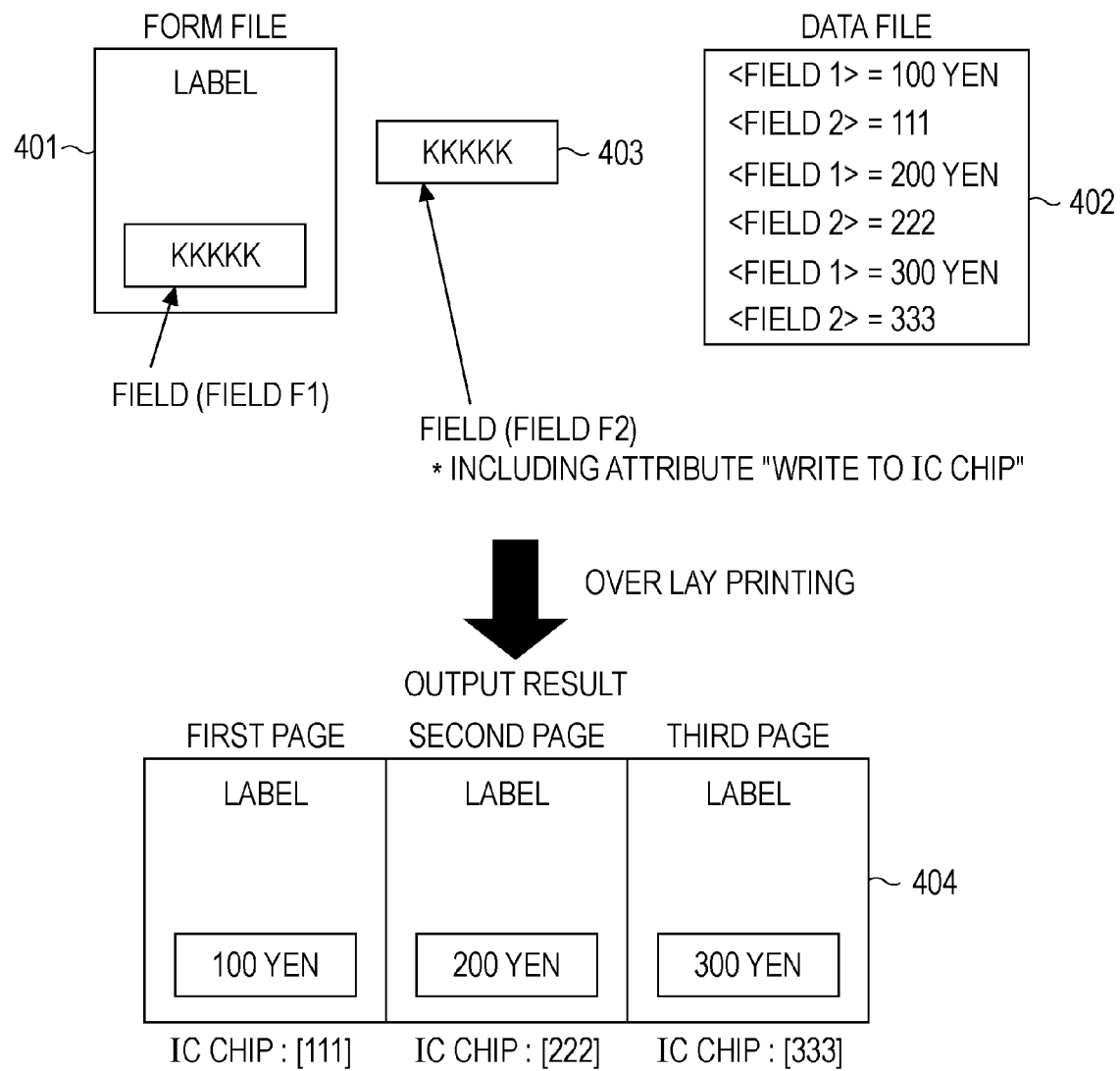
FIG. 13 is a diagram illustrating a second overlay printing operation performed using the printer in the related art.
Figure 14:
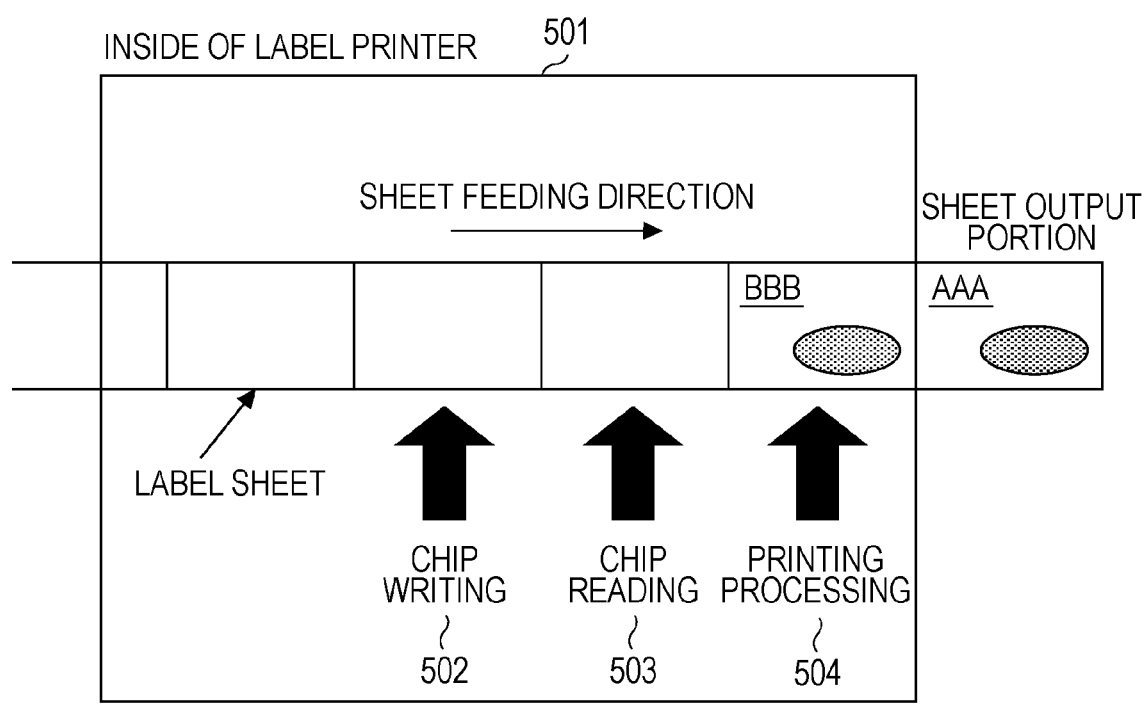
FIG. 14 is a diagram illustrating an example of a label printing operation performed using the printer in the related art.
Figure 15:
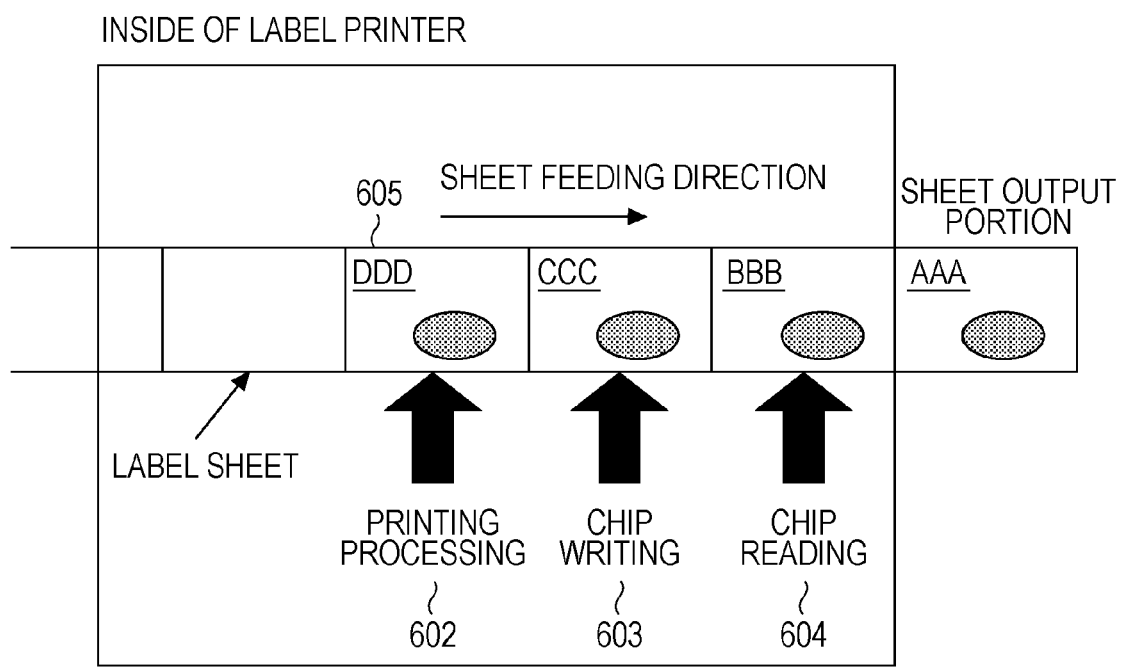
FIG. 15 is a diagram illustrating an example of another label printing operation performed using the printer in the related art.

The page in which an error occurred corresponds to a page which obtains, for example, an output result 1002 shown in FIG. 9.

The second print job further includes information about the page which has been subjected to the recovery printing and which corresponds to the N-th page of the first print job generated in step S901 and information about an (N+M)th page and the subsequent pages of the first print job generated in step S901.

In FIG. 5, the print job 702 corresponds to the second print job newly generated in step S904. According to the print job 702, the page in which an error occurred is generated first, and subsequently, two "blank" pages are generated. The two "blank" pages correspond to the fifth and sixth pages which have been subjected to the printing operation.

Thereafter, the fourth page (hereinafter referred to as a "recovery page") for the page in which an error occurred is generated. Then, the seventh and eighth pages which have not yet been processed are generated.

Since the print job 702 is newly printed and is combined with an output result 700 which has already been printed on the sheet, an output result 701 is obtained as a result of the process indicated by (5) of FIG. 5.

Figure 8:
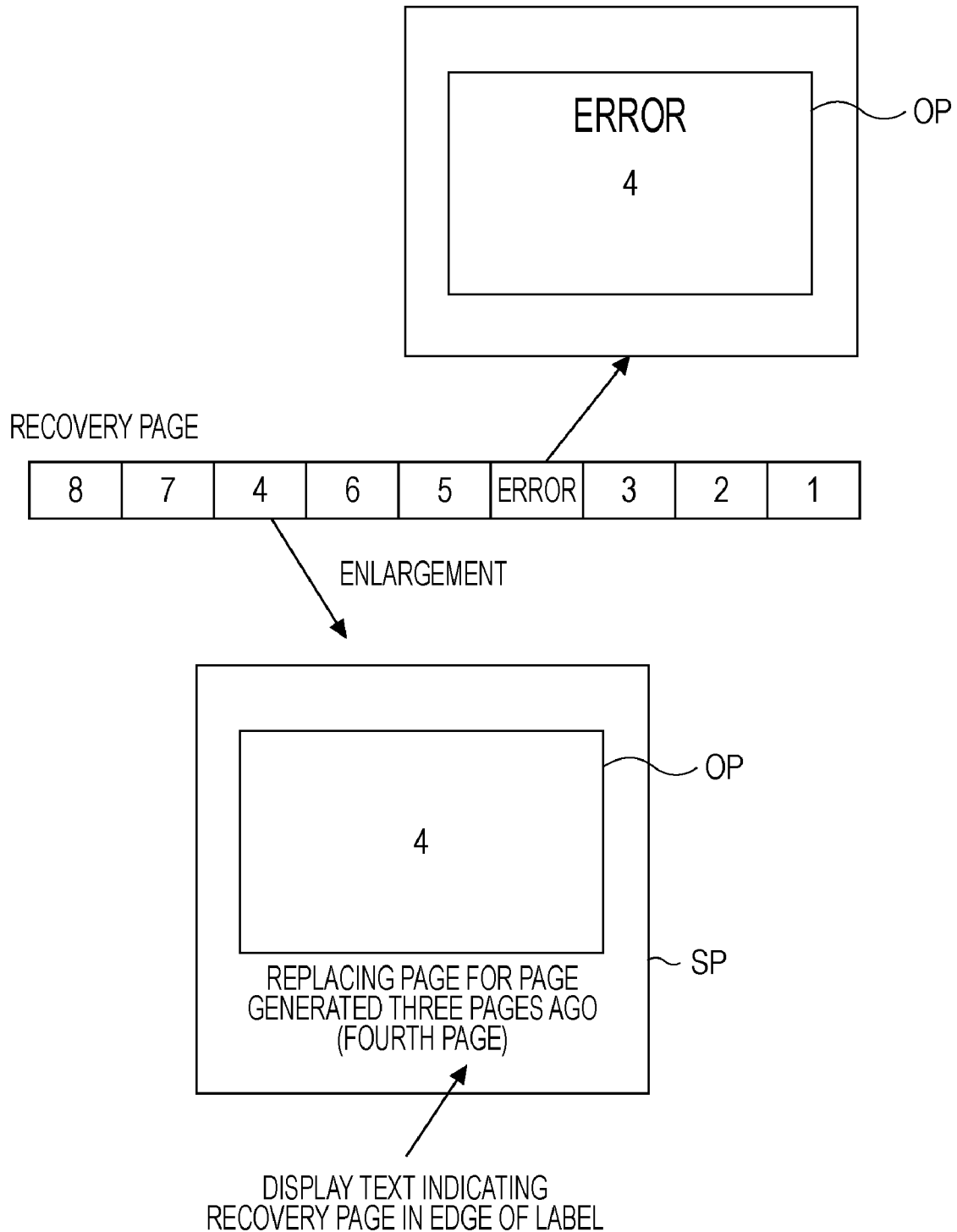
FIG. 8 is a diagram illustrating a recovery page which is subjected to a printing operation using the printing apparatus of this exemplary embodiment.

FIG. 8 is a diagram illustrating the recovery page which is subjected to the printing operation using the printing apparatus in this exemplary embodiment. Note that in an example shown in FIG. 8, the recovery page is enlarged, and recovery information is printed using the printer 113 on the recovery page. The recovery information indicates that a specific one of the pages which have been subjected to the printing operation is replaced by the recovery page.

Furthermore, in this exemplary embodiment, a label rolled sheet in which a rolled sheet is partly peeled is used.

In such a label sheet, when labels are put on the sheet, edge portions of the sheet are not used, that is, the edge portions are unnecessary portions. The library 105 instructs the printer 113 to print the information indicating that a specific one of the pages which have been subjected to the printing operation is replaced by the recovery page. In this example, text (a recovery message) "a replacing page for a page generated three pages ago (the fourth page)" is printed. Note that when such text is printed as a comment, color printing may be employed or an attribute of the text may be changed so that the text is distinctly viewed when compared with other regions.

Accordingly, the error occurred when data is being written to an IC chip and the recovery page can be visually confirmed after the printing operation is terminated and printed material is checked.

Furthermore, since the pages which have already been subjected to the printing operation at the time of the occurrence of an error are skipped as the "blank" pages in the recovery printing, printing efficiency is prevented from being deteriorated due to the recovery printing.

Note that, in FIG. 8, error information is printed in a normal print region (OP) in the page in which an error occurred.

Second Exemplary Embodiment

In the first exemplary embodiment described above, the text indicating that the error page is replaced by the recovery page (hereinafter referred to as a "replacing page" as needed) is printed in the edge portions of the label sheet. Alternatively, error information may be printed on a printing region of the error page so that the error page is easily distinguished. An exemplary embodiment employing such a method will be described hereinafter.

FIG. 9 is a diagram illustrating an example of a recovery operation performed using the printing apparatus of this exemplary embodiment. In an example shown in FIG. 9, a print job used to easily specify a recovery page for an error page is issued. Specifically, recovery information indicating that the error page is to be replaced by a specific one of the following pages is printed on the error page. The recovery operation according to this exemplary embodiment will be described hereinafter with reference to the workflow shown in FIG. 5.

In FIG. 9, a print job 1001 corresponds to the print job 702 shown in FIG. 5.

The print job 702 shown in FIG. 5 is generated so that error information generated on the basis of the number of "blank" pages which are to be skipped is displayed on the error page. Specifically, as print information for a first page of the print job 1001, text "a replacing page is provided three pages later" is output on the error page. Consequently, the output result 1002 is obtained.

Note that when a number N of "blank" pages are included in the print job 1001, the text to be output is generated as a combination of text and a value of N+1 resulting in "a replacing page is provided N+1 pages later".

Specifically, in the printing operation in this exemplary embodiment, the process performed in step S904 of FIG. 6 according to the first exemplary embodiment corresponds to a process of generating a page in which error information is displayed.

With this configuration, the user can easily recognize a page in which an error occurred and a recovery page therefor by merely checking an output result.

Third Exemplary Embodiment

Referring to memory maps shown in FIGS. 10 and 11, configurations of a printing apparatus and a data processing program which is readable using an information processing apparatus, according to a third exemplary embodiment of the present invention will be described.

FIG. 10 is a diagram illustrating the memory map of a storage medium which stores various data processing programs which are readable using the printing apparatus according to the third exemplary embodiment of the present invention.

FIG. 11 is a diagram illustrating the memory map of a storage medium which stores various data processing programs which are readable using the information processing apparatus according to the third exemplary embodiment of the present invention.

Although not shown, information used to manage a program group stored in the storage medium, such as version information and programmer information is stored in a directory of the storage medium, and in addition, information which relies on an OS of a device which reads the programs, such as icons representing the programs may be stored.

Furthermore, data relating to the various programs are also managed in the directory. Moreover, a program used to install the various programs in a computer or a program used to decompress a compressed program installed in the computer may be stored.

The functions described with reference to FIGS. 6 and 7 may be performed using the host computer by executing a program externally installed in the host computer. In this case, the present invention is applicable to a case where information group including various programs is supplied to an output device through a recording medium such as a CD-ROM, a flash memory, and FD, or through a network from a storage medium externally provided.

As described above, a storage medium which stores program code of software realizing the functions described above is supplied to a system or an apparatus. In this case, the system or the apparatus, i.e., a computer (a CPU or an MPU) reads and executes the program code stored in the storage medium whereby an advantage of the present invention is attained.

In this case, the program code read from the storage medium realizes a function according to the exemplary embodiments of the present invention, and therefore, the storage medium which stores the program code therein is included in the scope of the invention.

Accordingly, any program such as object code, a program executed using an interpreter, or script data supplied to the OS may be employed as long as a function as a program is provided.

Examples of a storage medium used to supply a program includes a flexible disc, a hard disc, an optical disc (such as a CD-ROM, a CD-R, a CD-RW, a ROM, and a DVD), a magneto-optical disc (MO), a magnetic tape, and a nonvolatile memory card.

In this case, the program code read from the storage medium realizes the functions of the exemplary embodiments, and therefore, the storage medium which stored the program code therein is included in the scope of the invention.

As a method for supplying the program, the program according to the exemplary embodiment of the present invention or a compressed file having a self-installation function may be downloaded to a recording medium such as a hard disc from a web site through the Internet using a browser of a client computer. Furthermore, the program may be obtained by dividing the program code constituting the program according to the exemplary embodiment of the present invention into a plurality of files and by downloading each of the plurality of files from a corresponding web site. That is, a WWW server and an ftp server which allow users to download program files used to realize functional processes according to the exemplary embodiments of the present invention using the computer are also included in the scope of the present invention.

Furthermore, the functions of the exemplary embodiments of the present invention is realized by encoding the program according to the exemplary embodiment of the present invention, by storing the encoded program in a storage medium such as a CD-ROM, by being distributed to the user, by allowing the users to download key information used to decode the encoded program from a web site through the Internet, and by executing the program decoded using the information key to thereby install the program in the computer.

The functions of the exemplary embodiments are realized not only by executing the program code read using the computer but also by employing other processes. For example, the functions of the exemplary embodiments are realized by performing entire processing or part of processing using the OS operating in the computer in accordance with instructions of the program code.

The functions of the exemplary embodiments are realized by writing the program code read from the storage medium to a memory included in a function expansion board inserted into the computer or a function expansion unit connected to the computer, and by performing entire processing or part of processing using a CPU, for example, included in the function expansion board or the function expansion unit in accordance with instructions of the program code.

According to the exemplary embodiments of the present invention, in a case where an error occurs when information is written to an IC chip, a recovery operation is performed.

Furthermore, even in a case where a subsequent page has already been printed when an error occurred at a time of writing information to an IC chip, the recovery operation is performed on a page in which an error occurred.

The present invention is not limited to the exemplary embodiments described above, and various modification (including organic combinations of the exemplary embodiments) may be made in accordance with the spirit and the scope of the invention.

While the present invention has been described with reference to various examples and exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-159220 filed Jun. 15, 2007, which is hereby incorporated by reference herein in its entirety.

What is claimed is:

1. A printing apparatus which performs information printing processing and information writing processing on a recording medium having information-writable IC chips based on information obtained from an information processing apparatus, the printing apparatus comprising:
a printing unit configured to print, in a predetermined information printing position, the information obtained from the information processing apparatus on page regions included in the recording medium which is conveyed;
a write unit configured to write, in an information writing position different from the information printing position, electronic information obtained from the information processing apparatus to the IC chips corresponding to, among the page regions, page regions which have been subjected to the information priming processing;
a determination unit configured to determine whether an error occurred when the write unit writes the electronic information;
a notification unit configured to notify the information processing apparatus of first page information used to specify one of the page regions where it is determined that an error occurred using the determination unit and second page information used to specify the page regions which have been subjected to the information priming processing using the priming unit when the error occurred;
a control unit configured to obtain recovery information generated using the information processing apparatus and to control a print restarting position of the recording medium so that a position of one of the page regions in which the information was being written at the time of occurrence of the error corresponds to the information printing position and
a recovery printing control unit configured to restart the information printing processing in the print restarting position in accordance with the recovery information, and configured to control the printing unit to print error information on the page in which the error occurred, the page corresponding to the print restarting position to skip succeeding pages which have been normally printed and to print a recovery page.

2. The printing apparatus according to claim 1, wherein the recovery printing control unit controls the printing unit to print on the recovery page the recovery information indicating that one of the preceding pages which have been printed is to be replaced by the recovery page.

3. The printing apparatus according to claim 1, wherein the recovery priming control unit controls the printing unit to print, on the page in which the error occurred, the recovery information indicating that the page in which the error occurred is to be replaced by one of the succeeding pages.

4. The printing apparatus according to claim 1, wherein the recovery printing control unit prints the recovery information outside a normal printing region.

5. The printing apparatus according to claim 1, wherein the recover printing control unit prints the error information in a normal printing region.

6. The printing apparatus according to claim 1, wherein the recovery printing control unit generates a recovery message based on the recovery information obtained from the information processing apparatus.

7. The printing apparatus according to claim 1, wherein the information writing position is -set on a downstream side relative to the information printing position determined using the printing unit.

8. An information processing apparatus which communicates with a printing apparatus which performs information printing processing and information writing processing on a recording medium having information-writable IC chips, the information processing apparatus comprising:
   a generation unit configured to generate, in a case where an error occurs when information is written to one of the IC chips, recovery information used to restart the information printing processing from a page in which the error occurred the based on page information transmitted from the printing apparatus; and
   a transmission unit configured to transmit the recovery information generated using the generation unit to the printing apparatus,
   wherein the generation unit generates recovery information including control information used to control a print restarting position of the recording medium in which the information writing processing was interrupted, so that a position of one of a plurality of page regions of the recording medium in which the information was being written at the time of occurrence of the error corresponds to the information printing position,
   wherein the generation unit generates recovery information including control information used to control a print restarting position of the recording medium in which the information writing processing was interrupted, so that a position of one of a plurality of page regions of the recording medium in which the information was being written at the time of occurrence of the error corresponds to the information printing position,
   wherein the information writing position is set on a downstream side relative to the information printing position determined using the printing apparatus.

9. An information processing system including a printing apparatus
   which performs information printing processing and information writing processing on a recording medium having information-writable IC chips based on information obtained from an information processing apparatus,
   wherein the printing apparatus includes: a printing unit configured to print, in a predetermined information printing position, the information obtained from the information processing apparatus on page regions included in the recording medium which is conveyed;
   a write unit configured to write, in an information writing position different from the information printing position, electronic information obtained from the information processing apparatus to the IC chips corresponding to, among the page regions, page regions which have been subjected to the information priming processing;
   a determination unit configured to determine whether an error occurred when the write unit writes the electronic information;
   a notification unit configured to notify the information processing apparatus of first page information used to specify one of the page regions where it is determined that an error occurred using the determination unit and second page information used to specify the page regions which have been subjected to the information priming processing using the priming unit when the error occurred;
   a control unit configured to obtain recovery information generated using the information processing apparatus and to control a print restarting position of the recording medium so that a position of one of the page regions in which the information was being written at the time of occurrence of the error corresponds to the information priming position; and
   a recovery priming control unit configured to restart the information priming processing in the print restarting position in accordance with the recovery information, and configured to control the priming unit to print error information on the page in which the error occurred, the page corresponding to the print restarting position, to skip succeeding pages which have been normally primed, and to print a recovery page, and wherein the information processing apparatus includes:
   a generation unit configured to generate, in a case where an error occurs when information is written to one of the IC chips, the recovery information used to restart the information priming processing from a page in which the information writing processing performed using the printing apparatus was interrupted, based on page information transmitted from the priming apparatus; and
   a transmission unit configured to transmit the recovery information to the priming apparatus.

10. A method for printing processing performed using the printing apparatus which performs information printing processing and information writing processing on a recording medium having information-writable IC chips based on information obtained from an information processing apparatus, the method comprising:
   printing, in a predetermined information printing position, the information obtained from the information processing apparatus on page regions included in the recording medium which is conveyed;
   writing, in a information writing position different from the information printing position, electronic information obtained from the information processing apparatus to the IC chips corresponding to, among the page regions, page regions which have been subjected to the information printing processing;
   determining whether an error occurred when the electronic information is written; notifying the information processing apparatus of first page information used to specify one of the page regions where it is determined that an error occurred and second page information used to specify the page regions which have been subjected to the information printing processing when the error occurred;
   obtaining recovery information generated using the information processing apparatus and controlling a print restarting position of the recording medium so that a position of one of the page regions in which the information was being written at the time of occurrence of the error corresponds to the information priming position; and
   restarting the information priming processing in the print restarting position in accordance with the recovery information, printing error information on the page in which the error occurred, the page corresponding to the print restarting position, skipping succeeding pages which have been normally primed, and priming a recovery page.

11. The method for printing processing according to claim 10, wherein the recovery information indicating that one of the preceding pages which has been printed is to be replaced by the recovery page is controlled to be printed on the recovery page.

12. The method for printing processing according to claim 10, wherein the recovery information indicating that the page in which the error occurred is to be replaced by one of the succeeding pages is controlled to be printed on the page in which the error occurred.

13. The method for printing processing according to claim 10, wherein the recovery information is printed outside a normal printing region.

14. The method for printing processing according to claim 10, wherein the error information is printed in a normal printing region.

15. The method for printing processing according to claim 10, wherein a recovery message is generated based on the recovery information obtained from the information processing apparatus.

16. A method for printing processing performed using an information processing apparatus which communicates with a printing apparatus which performs information printing processing and information writing processing on a recording medium having information-writable IC chips, the method for printing processing comprising:
generating, in a case where an error occurs when information is written to one of the IC chips, recovery information used to restart the information printing processing from a page in which the information writing processing performed using the printing apparatus was interrupted, based on page information transmitted from the printing apparatus; and transmitting the generated recovery information to the printing apparatus,
wherein recovery information including control information used to control a print restarting position of the recording medium in which the information writing processing was interrupted is generated so that a position of one of a plurality of page regions of the recording medium in which the information was being written at the time of occurrence of the error corresponds to the information printing position,
wherein the information writing position is set on a downstream side relative to the information printing position,
wherein recovery information including control information used to control a print restarting position of the recording medium in which the information writing processing was interrupted is generated so that a position of one of a plurality of page regions of the recording medium in which the information was being written at the time of occurrence of the error corresponds to the information printing position,
wherein the information writing position is set on a downstream side relative to the information printing position.

17. A printing apparatus which performs information printing processing and information writing processing on a recording medium having information-writable IC chips based on information obtained from an information processing apparatus, the printing apparatus comprising:
a printing unit configured to print the information obtained from the information processing apparatus on the recording medium;
a write unit configured to write electronic information obtained from the information processing apparatus on one of the IC chips included in a corresponding one of a plurality of pages which has been subjected to the information printing processing;
a determination unit configured to determine whether an error occurred when the write unit writes the electronic information; and
a recovery printing control unit configured to move back the recording medium to a position corresponding to one of a plurality of pages in which an error occurred when the determination unit determined that an error occurred, and to control the printing unit to print error information, to skip succeeding pages which have been normally printed, and to print a recovery page.

18. A system comprising:
a printing apparatus; and
an information processing apparatus including:
a generation unit configured to generate a first print job including an IC chip write instruction;
a receiving unit configured to receive error information from the printing apparatus including a page number (N) of an error page and a number of pages (M) printed after the error page;
a display unit configured to display cancellation of the first print job; and
a notification unit configured to instruct the printing apparatus to move back at least M+1 pages,
wherein the generation unit is further configured to generate a second print job including the page number (N) of the error page and any pages not printed in the first print job,
wherein the printing apparatus includes:
a receiving unit configured to receive the first print job from the information processing apparatus;
a print unit configured to print onto a recording medium;
a writing unit configured to write electronic information to an IC chip embedded within the recording medium;
a determination unit configured to determine if an error occurred in writing to the IC chip; and
a printing notification unit configured to transmit the page number (N) of the error page and the number of pages (M) printed after the error page to the information processing apparatus,
wherein the receiving unit is further configured to receive the second print job,
wherein the printing unit is further configured to shift the recording medium at least M+1 pages in a direction opposite a feeding direction and to print the second print job, and
wherein the writing unit is further configured to write electronic information in the second print job to the IC chip.

* * * * *